(12) United States Patent
Fersch et al.

(10) Patent No.: US 12,400,113 B2
(45) Date of Patent: Aug. 26, 2025

(54) METHOD AND APPARATUS FOR UPDATING A NEURAL NETWORK

(71) Applicant: DOLBY INTERNATIONAL AB, Amsterdam Zuidoost (NL)

(72) Inventors: Christof Fersch, Neumarkt (DE); Arijit Biswas, Schwaig bei Nuernberg (DE)

(73) Assignee: DOLBY INTERNATIONAL AB, Dublin (IE)

( * ) Notice: Subject to any disclaimer, the term of this patent is extended or adjusted under 35 U.S.C. 154(b) by 974 days.

(21) Appl. No.: 17/438,908

(22) PCT Filed: Mar. 5, 2020

(86) PCT No.: PCT/EP2020/055869
§ 371 (c)(1),
(2) Date: Sep. 13, 2021

(87) PCT Pub. No.: WO2020/187587
PCT Pub. Date: Sep. 24, 2020

(65) Prior Publication Data
US 2022/0156584 A1    May 19, 2022

Related U.S. Application Data

(60) Provisional application No. 62/818,879, filed on Mar. 15, 2019.

(30) Foreign Application Priority Data

May 15, 2019    (EP) .................................... 19174542

(51) Int. Cl.
*G06N 3/08*    (2023.01)
(52) U.S. Cl.
CPC ..................................... *G06N 3/08* (2013.01)

(58) Field of Classification Search
None
See application file for complete search history.

(56) References Cited

U.S. PATENT DOCUMENTS

| | | | |
|---|---|---|---|
| 5,907,822 | A | 5/1999 | Prieto, Jr. |
| 7,272,556 | B1 | 9/2007 | Aguilar |

(Continued)

FOREIGN PATENT DOCUMENTS

| | | |
|---|---|---|
| CN | 1625880 B | 8/2010 |
| CN | 105142096 B | 10/2018 |

(Continued)

OTHER PUBLICATIONS

A. Bhattacharya; A.G. Parlos; A.F. Atiya, "Prediction of MPEG-coded video source traffic using recurrent neural networks", 2003, IEEE (Year: 2003).*

(Continued)

*Primary Examiner* — Alan Chen

(57) ABSTRACT

Described herein is a method of generating a media bitstream to transmit parameters for updating a neural network implemented in a decoder, wherein the method includes the steps of: (a) determining at least one set of parameters for updating the neural network; (b) encoding the at least one set of parameters and media data to generate the media bitstream; and (c) transmitting the media bitstream to the decoder for updating the neural network with the at least one set of parameters. Described herein are further a method for updating a neural network implemented in a decoder, an apparatus for generating a media bitstream to transmit parameters for updating a neural network implemented in a decoder, an apparatus for updating a neural network implemented in a decoder and computer program products comprising a computer-readable storage medium with instruc- (Continued)

tions adapted to cause the device to carry out said methods when executed by a device having processing capability.

18 Claims, 3 Drawing Sheets

(56) References Cited

U.S. PATENT DOCUMENTS

| | | | |
|---|---|---|---|
| 10,089,383 B1 | 10/2018 | MacKay | |
| 10,210,861 B1 | 2/2019 | Arel | |
| 2004/0203559 A1 | 10/2004 | Stojanovic | |
| 2005/0025053 A1 | 2/2005 | Izzat | |
| 2011/0274162 A1 | 11/2011 | Zhou | |
| 2014/0119551 A1 | 5/2014 | Bharitkar | |
| 2015/0169774 A1 | 6/2015 | Budzienski | |
| 2017/0177993 A1* | 6/2017 | Draelos | G06N 3/045 |
| 2018/0122403 A1* | 5/2018 | Koretzky | G10L 21/028 |
| 2018/0151177 A1 | 5/2018 | Gemmeke | |
| 2018/0314716 A1 | 11/2018 | Kim | |
| 2018/0336471 A1 | 11/2018 | Rezagholizadeh | |
| 2018/0341839 A1 | 11/2018 | Malak | |
| 2018/0357514 A1 | 12/2018 | Zisimopoulos | |
| 2019/0045034 A1 | 2/2019 | Alam | |
| 2019/0050728 A1 | 2/2019 | Sim | |
| 2019/0065935 A1 | 2/2019 | Ozcan | |
| 2021/0327445 A1 | 10/2021 | Biswas | |

FOREIGN PATENT DOCUMENTS

| | | | | |
|---|---|---|---|---|
| CN | 105868829 A | | 8/2021 | |
| GB | 2553351 A | | 10/2016 | |
| JP | 0232679 | | 2/1990 | |
| WO | WO2015180866 A1 | * | 12/2015 | G10L 19/00 |
| WO | 2016199330 A1 | | 12/2016 | |
| WO | 2018078213 A1 | | 5/2018 | |
| WO | 2018150083 A1 | | 8/2018 | |
| WO | 2018163011 A1 | | 9/2018 | |

OTHER PUBLICATIONS

Feng Jiang; Wen Tao; Shaohui Liu; Jie Ren; Xun Guo; Debin Zhao, "An End-to-End Compression Framework Based on Convolutional Neural Networks", Aug. 2017 (Year: 2017).*

Yat Hong Lam, Alireza Zare, Caglar Aytekin, Francesco Cricri, "Compressing Weight-updates for Image Artifacts Removal Neural Networks", 2019 (Year: 2019).*

Li, Geng et al; DDP: Distributed Network Updates in SDN; 2018; IEEE 38th International Conference on Distributed Computing Systems; pp. 1468-1473. 6 pages.

Signal and Information Processing; Zhou Dashan. Professor Li Hua; The Design and Optimization of AVS-M Decoder; Tianjin University School of Electronic Information Engineering; Jan. 2006. p. 1-53. 60 pages.

Zeng Tao. Research of Adaptive Media Playout Based on Neural Network Control and Realization of Streaming Player. Aug. 15, 2006. pp. 1-96. 108 pages.

Zhu, Yinhao et al.; Bayesian Deep Convolutional Encoder-Decoder Networks for Surrogate Modeling and Uncertainty Quantification; Center for Informatics and Computational Science; Journal of Computational Physics; Jan. 23, 2018; pp. 1-52. 52 pages.

Choi, K. et al "A Tutorial on Deep Learning for Music Information Retrieval" Sep. 13, 2017, pp. 1-16.

Schmidt, W. et al "Feedforward Neural Networks with Random Weights" Pattern Recognition vol. II, 11th IAPR International Conference on the Hague, Netherlands, Aug. 30-Sep. 3, 1992.

Wang, Y. et al "Transferring GANs: Generating Images from Limited Data" May 2018, Computer Vision and Pattern Recognition, pp. 1-22.

Yang, Li-Chia, et al "MidiNet: A Convolutional Generative Adversarial Network for Symbolic-Domain Music Generation" Mar. 2017, 8 pages, accepted to ISMIR (International Society of Music Information Retrieval).

Biswas, A. et al "Audio Codec Enhancement with Generative Adversarial Networks" IEEE International Conference on Acoustics, Speech and Signal Processing, May 2020.

ISO/IEC JTC 1/SC 29/WG 6, "Information technology—Coded representation of immersive media—Part 4: MPEG-I immersive audio", ISO 23090-4:202, 2025, 6 Pages.

ETSI TS 103 190-2 V1.2.1, "Digital Audio Compression (AC-4) Standard; Part 2: Immersive and personalized audio", Reference RTS/JTC-043-2, Feb. 2018, 250 Pages.

ETSI TS 103 190-1 V1.3.1, "Digital Audio Compression (AC-4) Standard; Part 1: Channel based coding", Reference RTS/JTC-043-1, Feb. 2018, 293 Pages.

ISO/IEC23003-3, "Information technology—MPEG audio technologies—Part 3: Unified speech and audio coding", First edition Apr. 1, 2012, Reference No. ISO/IEC 23003-3:2012(E), 286 Pages.

ISO/IEC 14496-3, "Information technology—Coding of audio-visual objects—Part 3: Audio", Fourth edition Sep. 1, 2009, Reference No. ISO/IEC 14496-3:2009(E), 1416 Pages.

ISO/IEC 23008-3, "Information technology—High efficiency coding and media delivery in heterogeneous environments—Part 3: 3D audio", Second edition Feb. 2019, Reference No. ISO/IEC 23008-3:2019(E), 812 Pages.

* cited by examiner

METHOD AND APPARATUS FOR UPDATING A NEURAL NETWORK

CROSS-REFERENCE TO RELATED APPLICATIONS

This application claims priority of the following priority applications: U.S. provisional application 62/818,879 (reference: D19009USP1), filed 15 Mar. 2019 and EP application 19174542.1 (reference: D19009EP), filed 15 May 2019, which are hereby incorporated by reference.

TECHNOLOGY

The present disclosure generally relates to methods and apparatuses of generating a media bitstream to transmit parameters for updating a neural network in a decoder and for updating said neural network by the decoder.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

Recently, neural networks have gained more and more interest due to their continuously improving reliability.

Generally, a deep neural network Generator is trained by interaction, on a real-fake basis, with a so-called Discriminator. In particular, during training, the Generator is used to generate so-called fake data, and the Discriminator attempts to distinguish this fake data from real data. By iterating this procedure, the Generator is eventually trained to generate fake data that is close to real data (to the extent that the Discriminator cannot distinguish it from real data). Recent work is based mostly on deep convolutional Generative Adversarial Networks (GANs). GANs have already successfully been used for example in a variety of computer vision and image processing tasks, but also in speech and audio-related applications.

Once the deep neural network (e.g., deep neural network Generator) has been successfully trained on a specific task, it may be applied, for example at a decoder, for that specific task. However, for a trained neural network implemented in a decoder and acting upon media content that has been extracted from a bitstream provided by an encoder, the neural network may or may not yield satisfactory results, depending on the specific encoding constraints that had been present when encoding the media content at the encoder. This is even more the case as the encoding constraints may change over time. For example, a change in bitrate or framerate of the encoded media content may have an impact on the quality of the results of processing the media content by the neural network.

Thus, there is a need for methods and apparatus that allow for more flexibility in adapting a decoder-implemented neural network to specific requirements. There is particular need for methods and apparatus that enable a decoder-implemented neural network that processes media content to cope with variable encoding constraints at the stage of encoding the media content.

SUMMARY

In view of the above need, the present disclosure provides a method of generating a media bitstream to transmit parameters for updating a neural network implemented in a decoder, a method of updating a neural network implemented in a decoder, as well as corresponding apparatus and computer program products, having the features of the respective independent claims.

In accordance with a first aspect of the present disclosure there is provided a method of generating a media bitstream to transmit parameters for updating a neural network implemented in a decoder (e.g., a method of transmitting such media bitstream). The method may include the step of (a) determining at least one set of parameters for updating the neural network. The method may further include the step of (b) encoding the at least one set of parameters and media data to generate the media bitstream. This may involve encoding the at least one set of parameters and media data into the bitstream. The method may yet further include the step of (c) transmitting (outputting) the media bitstream to the decoder for updating the neural network with (e.g., using) the at least one set of parameters. Outputting/transmitting the media bitstream may involve transmitting the media bitstream via wired or wireless connections, or storing the media bitstream on a tangible medium and providing the tangible medium to the decoder.

In some embodiments, the media data may include one or more of audio data and/or video data.

In some embodiments, the at least one set of parameters may be encoded (into the media bitstream) based on a set of syntax elements. This may involve generating (creating) the syntax elements.

In some embodiments, in step (a) two or more sets of parameters for updating the neural network may be determined, and the set of syntax elements may include one or more syntax elements identifying a respective set of parameters for a respective update of the neural network to be performed.

In some embodiments, the neural network implemented in the decoder may be used for processing of media data, and, in the media bitstream, the at least one set of parameters for updating the neural network may be time-aligned with (that portion of) the media data which is processed by the neural network (e.g., after using the at least one set of parameters for updating the neural network). For example, the media data may be portioned into portions of media data (e.g., frames of media data). Then, for each portion, the respective at least one set of parameters for updating the neural network for processing that portion may be time-aligned with that portion. For frame-based media data, each frame may include media data and at least one set of corresponding parameters that can be used in processing that media data.

In some embodiments, the at least one set of parameters may be determined based on one or more of codec modes, a content of the media data, and encoding constraints. In some embodiments, the codec modes may include one or more of a bitrate, a video and/or audio framerate and a used core codec (e.g., ASF or SSF, etc.). In some embodiments, the content of the media data may include one or more of speech, music and applause. In some embodiments, the encoding constraints may include one or more of constraints for performance scalability and constraints for adaptive processing (e.g., for adaptive streaming) In some embodiments, the at least one set of parameters are included in the media bitstream prior to the media data to be processed by the respective updated neural network.

In some embodiments, the media data may be of MPEG-H Audio or MPEG-I Audio format and the media bitstream may be a packetized media bitstream of MHAS format. The at least one set of parameters (update parameters) and corresponding media data may be packaged together in the media bitstream.

In some embodiments, the at least one set of parameters may be encoded by encapsulating the at least one set of parameters into one or more MHAS packets of a (possibly new) MHAS packet type.

In some embodiments, the media data may be in AC-4, AC-3 or EAC-3 format.

In some embodiments, the at least one set of parameters may be encoded in the media bitstream as one or more payload elements.

In some embodiments, the media data may be in MPEG-4 or MPEG-D USAC format.

In some embodiments, the at least one set of parameters may be encoded in the media bitstream as one or more payload elements or as one or more data stream elements.

In some embodiments, the at least one set of parameters include parameters for updating weights of one or more layers of the neural network, including an identifier identifying whether the parameters for updating weights represent relative values or absolute values.

In some embodiments, the neural network may have a layer structure and the at least one set of parameters may include parameters for at least updating weights of a media data facing layer (i.e., first layer among a plurality of layers) and/or an output layer (i.e., last layer among the plurality of layers) of the neural network. In an example, the neural network has three or more layers, with at least one layer between the media data facing layer and the output layer.

In some embodiments, the media bitstream is generated by encoding, of the at least one set of parameters for updating weights of the plurality of layers of the neural network, only the parameters for updating weights of the media data facing layer and/or the output layer, and media data. In other words, parameters for updating weights of other layers are not encoded in the bitstream. In a first example, parameters for updating weights of all layers of the neural network implemented at the decoder are determined, but only the parameters for updating weights of the media data facing layer and/or the output layer are encoded in the media bitstream. In a second example, only parameters for updating weights of the media data facing layer and/or the output layer are determined, i.e. no parameters are determined for the other layers.

In accordance with a second aspect of the present disclosure there is provided a method for updating a neural network implemented in a decoder. The method may include the step of (a) receiving a coded media bitstream including media data and at least one set of parameters for updating the neural network. The method may further include the step of (b) decoding the received media bitstream to obtain the decoded media data and the at least one set of parameters for updating the neural network. The method may yet further include the step of (c) updating, by the decoder, the neural network with (e.g., using) the at least one set of parameters.

In some embodiments, the media data may include one or more of audio data and/or video data.

In some embodiments, the method may further include receiving a set of syntax elements and updating, by the decoder, the neural network with (e.g., using) the at least one set of parameters. This may be based on the received set of syntax elements.

In some embodiments, in step (a) two or more sets of parameters for updating the neural network may be included in the received coded media bitstream, and the received set of syntax elements may include one or more syntax elements identifying a respective set of parameters for a respective update of the neural network to be performed.

In some embodiments, the neural network may be used for processing of media data, and, in the received coded media bitstream, the at least one set of parameters may be time-aligned with (that portion of) the media data which is processed by the neural network (e.g., after using the at least one set of parameters).

In some embodiments, the neural network may have a layer structure and at least weights of a media data facing layer and/or an output layer of the neural network may be updated by the decoder with (e.g., using) the at least one set of parameters.

In some embodiments, the received media bitstream includes parameters for updating the media data facing layer and/or the output layer only, i.e. no parameters for updating the other layers of the neural network are included in the media bitstream. The step of decoding may comprise decoding the received media bitstream to obtain the decoded media data and the parameters for updating weights of the media data facing layer and/or the output layer. The step of updating the neural network may comprise updating the weights of the media data facing layer and/or the output layer of the neural network using the received parameters. For example, only the media data facing layer and/or the output layer are updated, while the other layers are not updated.

In accordance with a third aspect of the present disclosure there is provided an apparatus for generating a media bitstream to transmit parameters for updating a neural network implemented in a decoder (e.g., an apparatus for transmitting such media bitstream). The apparatus may include a processor configured to perform a method including the step of (a) determining at least one set of parameters for updating the neural network. The method may further include the step of (b) encoding the at least one set of parameters and media data to generate the media bitstream. The method may yet further include the step of (c) transmitting the media bitstream to the decoder for updating the neural network with (e.g., using) the at least one set of parameters.

In accordance with a fourth aspect of the present disclosure there is provided an apparatus for updating a neural network implemented in a decoder. The apparatus may include (a) a receiver for receiving a coded media bitstream including media data and at least one set of parameters for updating the neural network. The apparatus may further include (b) a decoder for decoding the received media bitstream to obtain the decoded media data and the at least one set of parameters for updating the neural network. The apparatus may yet further include (c) an updater for updating the neural network with (e.g., using) the at least one set of parameters.

In some embodiments, the receiver may further receive a set of syntax elements, and the updater may update the neural network with (e.g., using) the at least one set of parameters based on the set of syntax elements.

In some embodiments, two or more sets of parameters for updating the neural network may be included in the coded media bitstream received by the receiver, and the received set of syntax elements may include one or more syntax elements identifying a respective set of parameters for a respective update of the neural network to be performed.

In accordance with a fifth aspect of the present disclosure there is provided a computer program product comprising a computer-readable storage medium with instructions adapted to cause a device having processing capability (e.g., a processor) to carry out a method of generating a media bitstream to transmit parameters for updating a neural network implemented in a decoder when executed by the device.

In accordance with a sixth aspect of the present disclosure there is provided a computer program product comprising a computer-readable storage medium with instructions adapted to cause a device having processing capability (e.g., a processor) to carry out a method for updating a neural network implemented in a decoder when executed by the device.

It will be appreciated that method steps and apparatus features may be interchanged in many ways. In particular, the details of the disclosed method can be implemented as an apparatus adapted to execute some or all or the steps of the method, and vice versa, as the skilled person will appreciate. In particular, it is understood that methods according to the disclosure relate to methods of operating respective apparatus. It is further understood that respective statements made with regard to the method likewise apply to the corresponding apparatus. It is yet further understood that respective statements made with regard to the encoder/transmitter-side likewise apply to the decoder/receiver-side.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Overview

Figure 1:
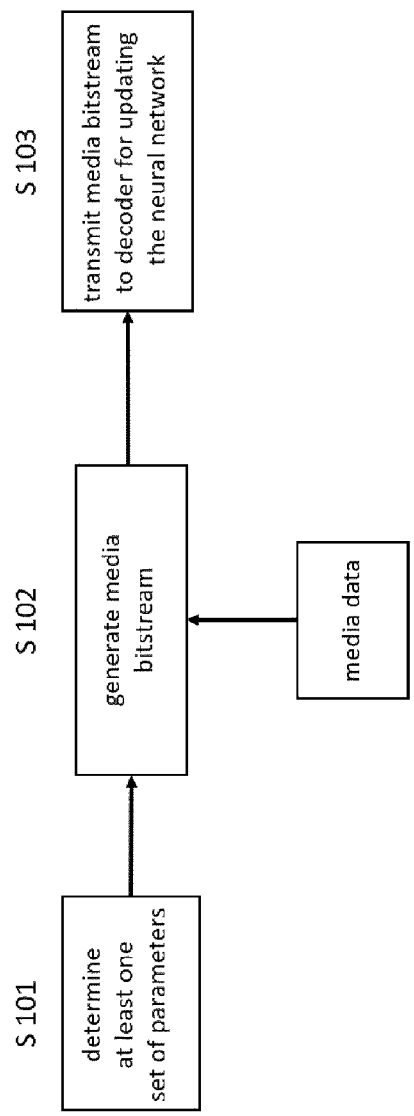
FIG. 1 illustrates a flow diagram of an example of a method of generating a media bitstream to transmit parameters for updating a neural network implemented in a decoder.

In the context of the present disclosure, deep neural networks may be used for processing audio and/or video media data. For audio, possible applications of neural networks include media analysis, media enhancement (e.g. coded audio enhancement), media classification (speech, movie, music, applause, etc.), media generation (e.g. deep generative models generating missing or completely new media data), or dialog enhancement. For video, possible applications of neural networks include deblocking or motion enhancement (e.g., for sports programs).

The neural network may receive the media content, possibly partitioned into suitable portions (e.g., frames), as input and outputs one or more of processed (e.g., enhanced) media content (audio and/or video), an analysis result of the media content, a classification of the media content, or newly generated media content.

As has been found, small changes in weights of existing neural networks in decoders/clients oftentimes enable significant improvements of quality of the processed media content, for example for speech content. Taking the generative adversarial network (GAN) as an example of a neural network, it has been observed that when using a deep neural network generator (G) to enhance coded audio at bitrate X, only little training time is needed (starting from the pre-trained model for bitrate X) to make it also work at (different) bitrate Y. In other words, the pre-trained model already works at bitrate Y, and only incremental training seems to be sufficient for achieving optimum performance Similar observations hold for different types of media content (e.g., pre-trained on speech and adapted for applause).

To determine the incremental update, the training of the GAN may be based on transfer learning. Transfer learning is a method in which a neural network that is trained to do a particular task is adapted to a different task.

In the context of the present disclosure, a decoder-implemented neural network is updated based on update parameters that are transmitted, together with corresponding media data, in an encoded (standardized) media bitstream. The update parameters may be packaged into the media bitstream together with corresponding media data. The media bitstream is decoded at the decoder, the update parameters and the corresponding media data are extracted, the update parameters are used to update the neural network before processing the corresponding media data, and the updated neural network processes the corresponding media data.

In other words, the present disclosure relates, at least in part, to conveying updates (update parameters) to be applied to existing neural networks in receiving devices (e.g., decoders) over (standardized) media bitstreams, together with corresponding media data that is to be processed by the neural networks. Preferably, those updates are packaged together with the media data on which the updated neural networks are applying their enhancements on. Further preferably, this involves time-aligned updates (update parameters) that are transmitted together with the media data, which also means that one can fine-tune a media-enhancing neural network based on the current media content.

Thus, broadly speaking, the present disclosure relates to transporting the neural network updates together with the encoded media to the decoding system, in a media bitstream. This applies to video, audio and other media-related content (e.g., haptics, etc.). A list on non-limiting examples on where the parameter updates could be transmitted within different types of bitstreams is provided further below.

Also, as will be described in more detail below, methods and apparatus described in the present disclosure and the underlying transport mechanism for parameters for updating neutral networks may be relevant to: ETSI AC-4, ETSI AC-3/EAC-3, ISO/IEC 23008-3 (MPEG-H Audio), ISO/IEC 14496-3 (MPEG-4 Audio) and all related standards (e.g., 3GPP, etc.), ISO/IEC 23003-3 (USAC), and ISO/IEC 23090-4 (MPEG-I Audio).

First, reference is made to FIG. 1, in which a method of generating a media bitstream to transmit parameters for updating a neural network implemented in a decoder is illustrated. In step S101, at least one set of parameters (update parameters) is determined for updating a neural network that is implemented in a decoder. The decoder may be understood as a receiving device for the at least one set of parameters to update the neural network. For transmitting the at least one set of parameters to the decoder, in step 102, the at least one set of parameters and media data are encoded to generate a media bitstream. That is, the at least one set of parameters is encoded into the media bitstream. The corresponding media data that is to be processed by a suitably updated neural network (i.e., updated using the at least one set of parameters) is encoded into the media bitstream together with the at least one set of parameters. For a packetized media bitstream, the media data and the at least one set of parameters may be packaged together. In general, the at least one set of parameters is preferably time aligned, in the media bitstream, with the corresponding media data. The generated media bitstream is then provided (e.g., output, or transmitted) to the decoder for updating the neural network in step 103. By generating the media bitstream including the at least one set of parameters and the media data, the at least one set of parameters for updating the neural network can thus be conveyed together with the media data to the decoder. In some embodiments, the media data may include one or more of audio data and/or video data.

Figure 2:
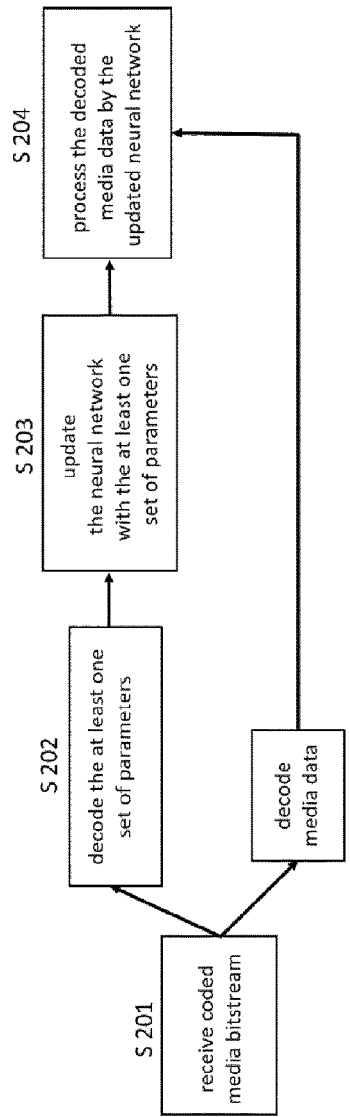
FIG. 2 illustrates a flow diagram of an example of a method for updating a neural network implemented in a decoder, and FIG. 3 schematically illustrates an example of a neural network that is implemented as a multi-layered Generator include an encoder stage and a decoder stage.

Next, reference is made to FIG. 2, in which a method for updating a neural network implemented in a decoder is illustrated. In step S201, a coded media bitstream including media data and at least one set of parameters for updating the neural network is received. In step S202, the coded media bitstream is decoded to obtain the decoded media data and the at least one set of parameters. The at least one set of parameters is then used in step S203, by the decoder, to update the neural network.

In some embodiments, the neural network may be used for processing of media data, and, in the received coded media bitstream, the at least one set of parameters may be time-aligned with the media data which are processed by the neural network. As illustrated in step S204 in the example of FIG. 2, in case the at least one set of parameters is time-aligned with the media data, the neural network may be updated by the decoder with the at least one set of parameters to subsequently process the decoded media data. In some embodiments, the media data may include one or more of audio data and/or video data.

The above methods may be implemented in respective apparatus. The above methods may further be implemented by respective computer program products.

Transmission of Update Parameters in the Media Bitstream

In some embodiments, the at least one set of parameters may be encoded based on a set of syntax elements. The syntax elements may allow transmitting (transporting) the at least one set of parameters in the generated media bitstream and may moreover allow the decoder to update the neural network. In some embodiments, the set of syntax elements may be received by the decoder and updating, by the decoder, the neural network with the at least one set of parameters may be based on the received set of syntax elements.

For example, the following syntax elements may be used for transmitting the at least one set of parameters in the media bitstream:

TABLE 1

Example of syntax elements for transmitting at least one set of parameters for updating a neural network in a media bitstream.

| Syntax | No. of bits |
|---|---|
| neural_network_update( ) | |
| { | |
|   while (neural_network_id != 0) { | 5 |
|     if (neural_network_id == 31) { | |
|       neural_network_id += variable_bits(5); | |
|     } | |
|     nn_update_config( ); | |
|     nn_update_size = variable_bits(8); | |
|     for (i = 0; i < nn_update_size; i++) { | |
|       nn_update_byte[i]; | 8 |
|     } | |
|   } | |

TABLE 1-continued

Example of syntax elements for transmitting at least one set of parameters for updating a neural network in a media bitstream.

| Syntax | No. of bits |
|---|---|
|   byte_align; | 0 . . . 7 |
| } | |
| nn_update_config( ) | |
| { | |
|   upd_type | 1 |
|   if (update_id_present) { | 1 |
|     update_id | 14 |
|   } | 8 |
|   number_of_upd_packages | 8 |
|   if (number_of_upd_packages > 0){ | |
|     upd_sequence_counter | |
|   } else { | |
|     upd_sequence_counter = 0 | |
|   } | |
| } | |

Referring to the example of table 1, the syntax elements described therein may be used in order to package needed bits for the at least one set of parameters used for the neural network update into a media bitstream. The syntax elements may, however, be modified depending on the codec of the respective media bitstream used to transmit the at least one set of parameters. For example, escaped_valued()-syntax as specified in ISO/IEC 23003-3, USAC may be used instead of variable_bits()-syntax as specified in ETSI 103 190.

Referring again to the example of table 1, the semantics used with the syntax elements may be the following:

neural_network_id may be used in order to identify the neural network in the decoder which has to be updated.

nn_update_byte may be used to carry the at least one set of parameters for updating the neural network in a specific format.

upd_type may be used to identify the type of the update to be performed with the at least one set of parameters, which may be, for example:

0—relative update (transmitted values added or subtracted from the original weights including gradients)

1—absolute update (transmitted values may replace the original weights)

Notably, the assignment of 0 and 1 to the relative and absolute updates is a non-limiting example, and the assignment might be the opposite in some implementation. What matters in the present context is that upd_type may indicate relative and absolute updates in some manner.

update_id may be used to identify the set of parameters for an update to be performed, i.e., to distinguish between different sets of update parameters. This allows to avoid mixing up of parameters from different sets of update parameters. In general, the syntax elements may include one or more syntax elements identifying a respective set of parameters for a respective update of the neural network to be performed.

number_of_upd_packages may signal the total number of update packages in for the related neural_network_id. An update with the at least one set of parameters may only be applied if a decoder (client) has received all related packages for the update.

upd_sequence_counter may be used to identify a specific package for the related update.

nn_update_byte may be used to carry the at least one set of parameters (for example, updates of weights). The format of those bytes may be dependent on the neural_network_id and other values such as upd_type.

While the structure of the neural network to be updated is not limited, in some embodiments, the neural network may have a (multi-)layer structure and the at least one set of parameters may include parameters for at least updating weights of a media data facing layer and/or an output layer of the neural network. In some embodiments, at least weights of the media data facing layer and/or the output layer of the neural network may therefore be updated by the decoder with the at least one set of parameters. In some embodiments, only the media data facing layer and/or an output layer of the neural network may be updated. For example, for a discriminative model (i.e., a neural network that classifies input media content), only the output layer may be updated.

The following syntax elements shown in table 2, for example, may be used for updating the neural network with the at least one set of parameters:

TABLE 2

Example of syntax elements for updating the neural network with the at least one set of parameters.

| Syntax | No. of bits |
|---|---|
| nn_update_example( ) { | |
| number_of_upd_weights = variable_bits(8); | |
| for (i=0; i< number_of_upd_weights; i++) { | |
| layer_id | 5 |
| weight_num_in_layer | 11 |
| weight_value | 8 |
| } | |
| byte_align; | 0 . . . 7 |
| } | |

Referring to the example of table 2, the semantics used with the syntax elements may be the following: layer_id may be used to identify the layer in which the weight has to be updated.

weight_num_in_layer may be used to identify which weight in the layer has to be updated.

weight_value may be used to carry the value of the weight which has to be updated. It may be interpreted dependent on the value of upd_type, i.e. relative versus absolute update:

If upd_type=0 signed byte
If upd_type=1 unsigned byte

Again, the assignment of 0 and 1 is understood to be a non-limiting example.

In some embodiments, the neural network implemented in the decoder may be used for the processing (e.g., enhancing, analyzing, classifying, etc.) of media data. Then, in the media bitstream, the at least one set of parameters (update parameters) for updating the neural network may be time-aligned with the media data which are processed by the neural network when updated with the at least one set of parameters. Put differently, if media data that is to be processed arrives at the decoder, the decoder-implemented neural network must be updated by parameters intended for that particular portion of media data. Accordingly, the respective update parameters must arrive at least simultaneously, possibly before, the corresponding media data for the processing of which the update parameters are needed.

In this context, time-aligned may refer to the order of encoding the at least one set of parameters and the media data into the media bitstream. For example, the at least one set of parameters may be encoded in the media bitstream prior to the media data to be processed by the respective updated neural network. In case the media data is audio data representing applause, the at least one set of parameters being determined for updating the neural network to process the media data representing applause is encoded prior to said media data in the bitstream. Alternatively, or additionally, the at least one set of parameters may be encoded in the media bitstream as such that the respective media data that is to be processed by the neural network updated with the at least one set of parameters is delayed with respect to that at least one set of parameters. Thereby, any delay caused by the update not being completed at the time of processing of the media data by the neural network can be avoided. If necessary, the update parameters may be buffered at the decoder and used for updating the neural network when the respective media data arrives at the decoder.

For example, for a frame-based format, the at least one set of parameters may be encoded in the same frame as the media data that is to be processed by the neural network, updated with this at least one set of parameters. Alternatively, the at least one set of parameters may be encoded in an earlier frame, with a fixed offset in units of frames, between the frame including the at least one set of parameters and the frame including the media data that is to be processed by the neural network, updated with the afore-mentioned at least one set of parameters.

In some embodiments, the at least one set of parameters may be determined based on one or more of codec modes, a content of the media data and encoding constraints.

In some embodiments, the codec modes may include one or more of a bitrate, a video and/or audio framerate and a used core codec. If the at least one set of parameters is determined, for example, based on a bitrate, this may be utilized to time-align the at least one set of parameters in the media bitstream with reference to the respective media data having the bitrate. The same may hold for the video and/or audio framerate and the used core codec.

In some embodiments, the content of the media data may be one or more of speech, music and applause for audio data. Likewise, the content of the media data may be video data. If the at least one set of parameters is determined, for example, based on a respective content of the audio and/or video data, this may be utilized to time-align the at least one set of parameters in the media bitstream in reference to the respective media data having the content.

In some embodiments, the encoding constraints may include one or more of constraints for performance of scalability and constraints for adaptive processing. If the at least one set of parameters is determined, for example, based on a respective encoding constraint, this may also be utilized to time-align the at least one set of parameters in the media bitstream in reference to the respective media data for which the encoding constraint holds.

While the format of the media data is not limited, in some embodiments, the media data may be of MPEG-H Audio (ISO/IEC 23008-3) or MPEG-I Audio format and the media bitstream may be a packetized bitstream in MHAS format. In some embodiments, the at least one set of parameters may then be encoded by encapsulating the at least one set of parameters into one or more MHAS packets of a new MHAS packet type. For example, one possible way for transmitting the needed payload may be to assign the new MHAS packet type PACTYP_NN_UPDATE.

The decoder may identify the payload for updating a respective (pre-defined) neural network by interpreting the MHAS packet type. For this purpose, in the MPEG-H Audio standard, the syntax elements may be amended as shown in the following table 3.

TABLE 3

Example of amended syntax elements in the MPEG-H Audio standard for transmitting the at least one set of parameters in the media bitstream.

| Syntax | No. of bits | Mnemonic |
|---|---|---|
| MHASPacketPayload(MHASPacketType) <br> { <br>   switch (MHASPacketType) { <br>     ... <br>     case PACTYP_NN_UPDATE: <br>       for (i=0; i< MHASPacketLength; i++) { <br>         neural_network_update_byte[i]; <br>       } <br>   } <br>   ... <br> } <br> ... <br> } | 8 | bslbf |

Referring to the example of table 3, neural_network_update_byte may carry the bytes of the formerly described syntax element neural_network_update (). Additionally, the bitstream extension mechanism usacExtElement may be used, depending on the (nature of the) neural network to be updated.

In some embodiments, the media data may be in AC-4, AC-3, EAC-3, MPEG-4 or MPEG-D USAC format. Further, in some embodiments, the at least one set of parameters may then be encoded in the media bitstream as one or more payload elements or as one or more data stream elements (DSEs).

In the case of AC-4 (ETSI 103 190), an example of transmitting the at least one set of parameters in the media bitstream may be to transmit (or transport) the neural_network_update ()-element (see TABLE 1) via an emdf_payloads_substream()-element. In order to enable this, a free emdf_payload_id may be used in order to enable identification of this EMDF-payload. Every byte contained in the neural_network_update ()-element may then be transmitted (transported) as emdf_payload_byte.

In the case of AC-3 and EAC-3 (ETSI 102 366), an example of transmitting the at least one set of parameters in the media bitstream may be to transmit (or transport) the neural_network_update ()-element via an emdf_container()-element as described in ETSI 102 366, Annex H. To enable this, a free emdf_payload_id may be used to enable the identification of the EMDF-payload. This ID may be the same as for the case of AC-4 in order to fulfill the principles of the EMDF framework. Every byte contained in the neural_network_update ()-element may then be transmitted (transported) as emdf_payload_byte.

In the case of MPEG-4 (AAC, HE-AACv1, HE-AACv2), at least two independent extension mechanisms as defined by MPEG-4 may be used to transmit the at least one set of parameters for updating the neural network in the media bitstream. When using the first extension mechanism, the at least one set of parameters may be transmitted as data stream within a data stream element (DSE) as shown in the following example:

```
data_stream_element( ) {
    element_instance_tag; 4 uimsbf
    data_byte_align_flag; 1 uimsbf
    cnt = count; 8 uimsbf
    if (cnt == 255)
        cnt += esc_count; 8 uimsbf
    if (data_byte_align_flag)
```

-continued

```
        byte_aligmnent( );
    for (i = 0; i < cnt; i++)
        data_stream_byte[element_instance_tag][i]; 8 uimsbf
```

| | |
|---|---|
| element_instance_tag | A number to identify the data stream element. Must be handled with care if multiple DSEs are present |
| cnt | Size of the neural network update( ) in bytes |
| data_stream_byte | neural network update( ) payload, see above |

When using the second extension mechanism, it may be exploited that MPEG-4 defines (especially for non-resilience payloads) an extension mechanism with the top level syntactic (syntax) element extension_payload contained inside a Fill Element ID_FIL as shown in the following example:

```
fill_element( ) {
    cnt = count; 4 uimsbf
    if (cnt ==15)
        cnt += esc_count - 1; 8 uimsbf
    while (cnt > 0) {
        cnt -= extension_payload(cnt);
    }
}
```

Alternatively, or additionally, the extension_type EXT_DATA_ELEMENT of MPEG-4 may be used. In this case, the bytes for the neural_network_updated()-syntax element may be transported as extension_payload().

In the case of MPEG-D USAC, the at least one set of parameters for updating the neural network may be transmitted based on a USAC extension element as defined in 23003-3. A new usacExtElementType may be named ID_EXT_ELE_NN_UPDATE, and the corresponding syntax elements in Table 17 of 23003-3, "Syntax of UsacExtElementConfigO" may be amended as in the following example:

| Syntax | No. of bits | Mnemonic |
|---|---|---|
| UsacExtElementConfig( ) <br> { <br>   ... <br>   case ID_EXT_ELE_NN_UPDATE: <br>     neural_network_update( ) <br>   ... <br>   } <br>   ... <br> } | | |

Neural Network Structure

While the structure of the neural network is not limited, the neural network may have a (multi-)layer structure. Such a layer structure will be described on the basis of the following non-limiting example.

Figure 3:
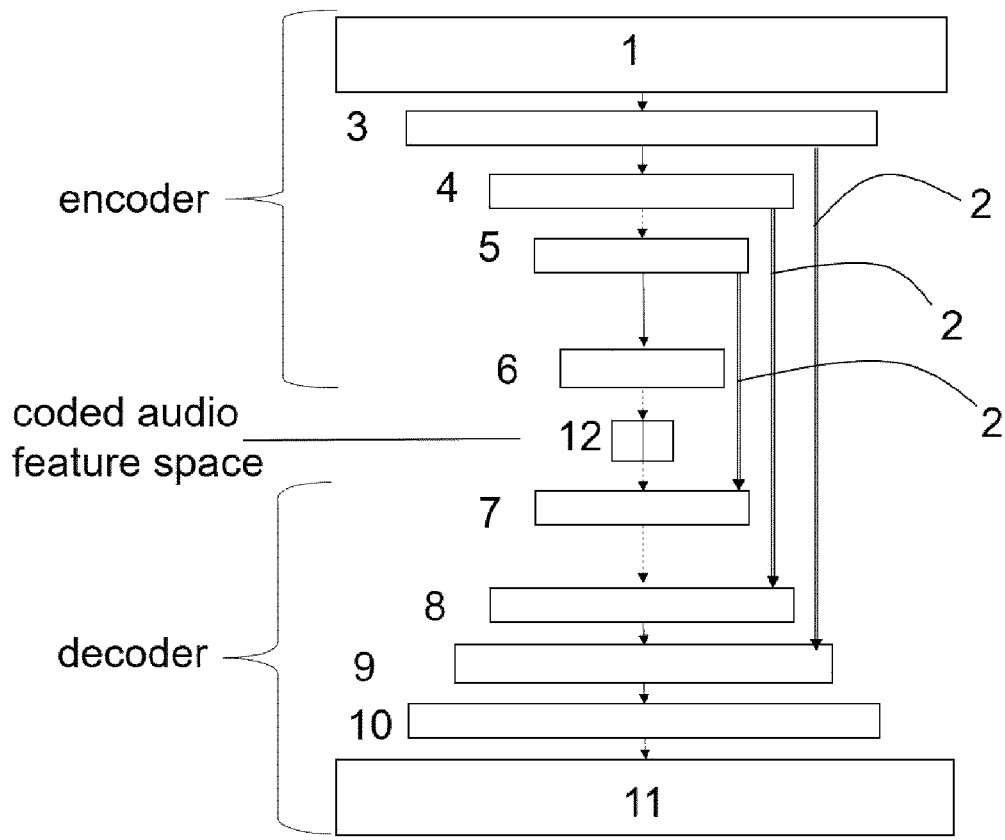

Referring to the example of FIG. 3, the neural network may be, for example, a so-called Generator trained in a Generative Adversarial Network setting to process audio data. While the structure of such a Generator is generally not limited, the Generator may include an encoder stage and a decoder stage. The encoder stage and the decoder stage of the Generator may be fully convolutional. The decoder stage may mirror the encoder stage and the encoder stage as well as the decoder stage may each include a number of L layers with a number of N filters in each layer L. L may be a natural number ≥1 and N may be a natural number ≥1. The size (also known as kernel size) of the N filters is not limited and may be chosen according to application requirements. The filter size may, however, be the same in each of the L layers.

In the example of FIG. 3, raw audio data to be processed may be input into the Generator in a first step, 1. The first illustrated encoder layer, 3, may thus be a media data facing layer. In each of the L layers of the encoder stage, the number of filters may increase. Each of the filters may operate on the audio data input into each of the encoder layers with a stride of 2. In this, the depth gets larger as the width (duration of signal in time) gets narrower. Thus, a learnable down-sampling by a factor of 2 may be performed.

Alternatively, the filters may operate with a stride of 1 in each of the encoder layers followed by a down-sampling by a factor of 2 (as in known signal processing).

In at least one encoder layer and in at least one decoder layer, a non-linear operation may be performed in addition as an activation. The non-linear operation may include one or more of a parametric rectified linear unit (PReLU), a rectified linear unit (ReLU), a leaky rectified linear unit (LReLU), an exponential linear unit (eLU) and a scaled exponential linear unit (SeLU). Depending on the application of the Generator, however, also other activations are conceivable.

As is schematically illustrated in the example of FIG. 3, the respective decoder layers, 7, 8, and, 9, may mirror the encoder layers, 5, 4, and, 3. While the number of filters in each layer and the filter widths in each layer may be the same in the decoder stage as in the encoder stage, up-sampling of the audio signal starting from the narrow widths (duration of signal in time) may be performed by two alternative approaches. Fractionally-strided convolution (also known as transposed convolution) operations may be used in the layers of the decoder stage to increase the width of the audio signal to the full duration, i.e. the frame of the audio signal that was input into the Generator.

Alternatively, in each layer of the decoder stage the filters may operate on the audio data input into each layer with a stride of 1, after up-sampling and interpolation is performed as in conventional signal processing with the up-sampling factor of 2.

An output layer (convolution layer), 10, may follow the decoder stage before the processed audio data are output in the final step, 11. In the output layer, the activation may be different to the activation performed in the at least one of the encoder layers and the at least one of the decoder layers. The activation may be any non-linear function that is bounded to the same range as the audio signal that is input into the Generator. For example, a time signal to be enhanced may be bounded between +/−1. The activation may then be based, for example, on a tanh operation.

In between the encoder stage and the decoder stage, the audio data may be modified. The modification may be based on a coded audio feature space (also known as bottleneck layer), 12. The modification in the coded audio feature space may be done for example by concatenating a random noise vector (z) with the vector representation (c) of the raw audio data as output from the last layer in the encoder stage. The random noise vector may be set to z=0.

Skip connections, 2, may exist between homologues layers of the encoder stage and the decoder stage to maintain the time structure or texture of the coded audio as the coded audio feature space described above may thus be bypassed preventing loss of information. Skip connections may be implemented using one or more of concatenation and signal addition. Due to the implementation of skip connections, the number of filter outputs may be "virtually" doubled.

Referring to the example in FIG. 3, a structure of a Generator as a non-limiting example for a neural network may be as follows:

1/Input: raw audio data
3/encoder layer L=1: filter number N=16, filter size=31, activation=PReLU
4/encoder layer L=2: filter number N=32, filter size=31, activation=PReLU
5/encoder layer L=11: filter number N=512, filter size=31
6/encoder layer L=12: filter number N=1024, filter size=31
12/coded audio feature space
7/decoder layer L=1: filter number N=512, filter size=31
8/decoder layer L=10: filter number N=32, filter size=31, activation PReLU
9/decoder layer L=11: filter number N=16, filter size=31, activation PReLU
10/output layer: filter number N=1, filter size=31, activation tanh
11/output enhanced audio data
2/skip connections Notably, the structure described above merely represents a non-limiting example Depending on the application of such a Generator, the number of layers in the encoder stage and in the decoder stage may be down-scaled or up-scaled, respectively. Moreover, neural networks in the context of the present disclosure are understood to be not limited to GAN-related models. For example, while the above example refers to a generative network model, the neural network may also be a neural network based on a discriminative network model. In general, the present disclosure is applicable to any type of neural network that is suitable for processing media content (e.g., audio and/or video content).

Returning to the example of the Generator illustrated in FIG. 3, training of the Generator may be facilitated in a Generative Adversarial Network setting based on a true-false interaction with a Discriminator. In order to determine at least one set of parameters for updating such a neural network, the inventors have found that the at least one set of parameters may be determined based on a Generative Adversarial Network setting including a pre-trained Generator and a non-trained Discriminator. In this setting, the Generator may be updated incrementally with very limited training data (of different configuration) and time, improving its performance for the new (updated) configuration. With this approach, all the weights in the Generator may be updated incrementally. However, the most important layer for a neural network operating on a new domain may be the layer facing the signal (e.g., facing the media data). Therefore, to limit the update parameters to only few weights (and as a consequence reduce the bitrate overhead), all the weights of the pre-trained Generator may be frozen, and only the media data (signal) facing layer and/or the output layer of the Generator may be updated.

Interpretation

Unless specifically stated otherwise, as apparent from the following discussions, it is appreciated that throughout the disclosure discussions utilizing terms such as "processing," "computing," "calculating," "determining", analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one example embodiment", "some example embodiments" or "an example embodiment" means that a particular feature, structure or characteristic described in connection with the example embodiment is included in at least one example embodiment of the present disclosure. Thus, appearances of the phrases "in one example embodiment", "in some example embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, FIG., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

Various aspects of the present invention may be appreciated from the following enumerated example embodiments (EEEs):

1. A method of generating a media bitstream to transmit parameters for updating a neural network implemented in a decoder, wherein the method includes the steps of:
   (a) determining at least one set of parameters for updating the neural network;
   (b) encoding the at least one set of parameters and media data to generate the media bitstream; and
   (c) transmitting the media bitstream to the decoder for updating the neural network with the at least one set of parameters.
2. Method according to EEE 1, wherein the media data include one or more of audio data and/or video data.
3. Method according to EEE 1 or EEE 2, wherein the at least one set of parameters is encoded based on a set of syntax elements.
4. Method according to EEE 3, wherein in step (a) two or more sets of parameters for updating the neural network are determined, and wherein the set of syntax elements includes one or more syntax elements identifying a respective set of parameters for a respective update of the neural network to be performed.
5. Method according to any of EEEs 1-4, wherein the neural network implemented in the decoder is used for processing of media data, and wherein, in the media bitstream, the at least one set of parameters for updating the neural network is time-aligned with the media data which are processed by the neural network.
6. Method according to EEE 5, wherein the at least one set of parameters is determined based on one or more of codec modes, a content of the media data and encoding constraints.
7. Method according to EEE 6, wherein the codec modes include one or more of a bitrate, a video and/or audio framerate and a used core codec.
8. Method according to EEE 6 or EEE 7, wherein the content of the media data includes one or more of speech, music and applause.
9. Method according to any of EEEs 6-8, wherein the encoding constraints include one or more of constraints for performance scalability and constraints for adaptive processing.
10. Method according to any of EEEs 1-9, wherein the media data is of MPEG-H Audio or MPEG-I Audio format and the media bitstream is a packetized media bitstream of MHAS format.
11. Method according to EEE 10, wherein the at least one set of parameters is encoded by encapsulating the at least one set of parameters in one or more MHAS packets of a new MHAS packet type.
12. Method according to any of EEEs 1-11, wherein the media data is in AC-4, AC-3 or EAC-3 format.
13. Method according to EEE 12, wherein the at least one set of parameters is encoded in the media bitstream as one or more payload elements.
14. Method according to any of EEEs 1-13, wherein the media data is in MPEG-4 or MPEG-D USAC format.

15. Method according to EEE 14, wherein the at least one set of parameters is encoded in the media bitstream as one or more payload elements or one or more data stream elements.
16. Method according to any of EEEs 1-15, wherein the neural network has a layer structure and the at least one set of parameters includes parameters for at least updating weights of a media data facing layer and/or an output layer of the neural network.
17. Method of updating a neural network implemented in a decoder, the method including the steps of:
    (a) receiving a coded media bitstream including media data and at least one set of parameters for updating the neural network;
    (b) decoding the received media bitstream to obtain the decoded media data and the at least one set of parameters for updating the neural network; and
    (c) updating, by the decoder, the neural network with the at least one set of parameters.
18. Method according to EEE 17, wherein the media data include one or more of audio data and/or video data.
19. Method according to EEE 17 or EE 18, wherein the method further includes receiving a set of syntax elements and wherein updating, by the decoder, the neural network with the at least one set of parameters is based on the received set of syntax elements.
20. Method according to EEE 19, wherein in step (a) two or more sets of parameters for updating the neural network are included in the received coded media bitstream, and wherein the received set of syntax elements includes one or more syntax elements identifying a respective set of parameters for a respective update of the neural network to be performed.
21. Method according to any of EEEs 17-20, wherein the neural network is used for processing of media data, and wherein, in the received coded media bitstream, the at least one set of parameters is time-aligned with the media data which are processed by the neural network.
22. Method according to any of EEEs 17-21, wherein the neural network has a layer structure and wherein at least weights of a media data facing layer and/or an output layer of the neural network are updated by the decoder with the at least one set of parameters.
23. An apparatus for generating a media bitstream to transmit parameters for updating a neural network implemented in a decoder, wherein the apparatus includes a processor configured to perform a method including the steps of:
    (a) determining at least one set of parameters for updating the neural network;
    (b) encoding the at least one set of parameters and media data to generate the media bitstream; and
    (c) transmitting the media bitstream to the decoder for updating the neural network with the at least one set of parameters.
24. An apparatus for updating a neural network implemented in a decoder, the apparatus including:
    (a) a receiver for receiving a coded media bitstream including media data and at least one set of parameters for updating the neural network;
    (b) a decoder for decoding the received media bitstream to obtain the decoded media data and the at least one set of parameters for updating the neural network; and
    (c) an updater for updating the neural network with the at least one set of parameters.
25. Apparatus according to EEE 24, wherein the receiver further receives a set of syntax elements, and wherein the updater updates the neural network with the at least one set of parameters based on the set of syntax elements.
26. Apparatus according to EEE 25, wherein two or more sets of parameters for updating the neural network are included in the coded media bitstream received by the receiver, and wherein the received set of syntax elements includes one or more syntax elements identifying a respective set of parameters for a respective update of the neural network to be performed.
27. A computer program product comprising a computer-readable storage medium with instructions adapted to cause the device to carry out the method according to any of EEEs 1-16 when executed by a device having processing capability.
28. A computer program product comprising a computer-readable storage medium with instructions adapted to cause the device to carry out the method according to any of EEEs 17-22 when executed by a device having processing capability.

The invention claimed is:

1. A method of generating a media bitstream to transmit parameters for updating a neural network implemented in a decoder, the neural network having a plurality of layers, with a media data facing layer as a first layer of the plurality of layers and an output layer as a last layer of the plurality of layers, wherein the method includes the steps of:
    (a) determining at least one set of parameters for updating weights of the plurality of layers of the neural network, including parameters for updating weights of the media data facing layer and/or the output layer;
    (b) generating the media bitstream by encoding, of the at least one set of parameters for updating weights of the plurality of layers of the neural network, only the parameters for updating weights of the media data facing layer and/or the output layer, and media data, the media data including one or more of audio data and/or video data; and
    (c) transmitting the media bitstream to the decoder for updating the neural network with the parameters that were included in the media bitstream for updating weights of the media data facing layer and/or the output layer.

2. The method according to claim 1, wherein the at least one set of parameters is encoded based on a set of syntax elements.

3. The method according to claim 2, wherein in step (a) two or more sets of parameters for updating the neural network are determined, and wherein the set of syntax elements includes one or more syntax elements identifying a respective set of parameters for a respective update of the neural network to be performed.

4. The method according to claim 1, wherein the neural network implemented in the decoder is used for processing of media data, and wherein, in the media bitstream, the at least one set of parameters for updating the neural network is time-aligned with the media data which are processed by the neural network.

5. The method according to claim 4, wherein the at least one set of parameters is determined based on one or more of codec modes, a content of the media data and encoding constraints.

6. The method according to claim 5, wherein the codec modes include one or more of a bitrate, a video and/or audio framerate and a used core codec.

7. The method according to claim 5, wherein the content of the media data includes one or more of speech, music and applause.

8. The method according to claim 5, wherein the encoding constraints include one or more of constraints for performance scalability and constraints for adaptive processing.

9. The method according to claim 5, wherein the at least one set of parameters are included in the media bitstream prior to the media data to be processed by the respective updated neural network.

10. The method according to claim 1, wherein the media data is of MPEG-H Audio or MPEG-I Audio format and the media bitstream is a packetized media bitstream of MHAS format.

11. The method according to claim 10, wherein the at least one set of parameters is encoded by encapsulating the at least one set of parameters in one or more MHAS packets of a new MHAS packet type.

12. The method according to claim 1, wherein the media data is in AC-4, AC-3, EAC-3 format, MPEG-4 or MPEG-D USAC format.

13. The method according to claim 12, wherein the at least one set of parameters is encoded in the media bitstream as one or more payload elements.

14. The method according to claim 13, wherein the at least one set of parameters is encoded in the media bitstream as one or more payload elements or one or more data stream elements.

15. The method according to claim 1, wherein the at least one set of parameters include an identifier identifying whether the parameters for updating weights represent relative values or absolute values.

16. A computer program product comprising a computer-readable storage medium with instructions adapted to cause the device to carry out the method according to claim 1 when executed by a device having processing capability.

17. A method of updating a neural network implemented in a decoder, the neural network having a plurality of layers, with a media data facing layer as a first layer of the plurality of layers and an output layer as a last layer of the plurality of layers, the method including the steps of:
(a) receiving a coded media bitstream including media data and parameters for updating weights of the media data facing layer and/or the output layer of the neural network;
(b) decoding the received media bitstream to obtain the decoded media data and the parameters for updating weights of the media data facing layer and/or the output layer of the neural network; and
(c) updating, by the decoder, the media data facing layer and/or the output layer with the received parameters that were included in the media bitstream for updating weights of the media data facing layer and/or the output layer of the neural network.

18. An apparatus for generating a media bitstream to transmit parameters for updating a neural network implemented in a decoder, the neural network having a plurality of layers, with a media data facing layer as a first layer of the plurality of layers and an output layer as a last layer of the plurality of layers, wherein the apparatus includes a processor configured to perform a method including the steps of:
(a) determining at least one set of parameters for updating weights of the plurality of layers of the neural network, including parameters for updating weights of the media data facing layer and/or the output layer;
(b) generating the media bitstream by encoding, of the at least one set of parameters for updating weights of the plurality of layers of the neural network, only the parameters for updating weights of the media data facing layer and/or the output layer, and media data, the media data including one or more of audio data and/or video data; and
(c) transmitting the media bitstream to the decoder for updating the neural network with the parameters that were included in the media bitstream for updating weights of the media data facing layer and/or the output layer.

* * * * *

UNITED STATES PATENT AND TRADEMARK OFFICE
CERTIFICATE OF CORRECTION

| | |
|---|---|
| PATENT NO. | : 12,400,113 B2 |
| APPLICATION NO. | : 17/438908 |
| DATED | : August 26, 2025 |
| INVENTOR(S) | : Christof Fersch et al. |

Page 1 of 1

It is certified that error appears in the above-identified patent and that said Letters Patent is hereby corrected as shown below:

In the Claims

Column 20, Line 34, in Claim 1, delete "(b)generating" and insert --(b) generating--

Signed and Sealed this
Ninth Day of December, 2025

John A. Squires
*Director of the United States Patent and Trademark Office*